Patented Feb. 14, 1950

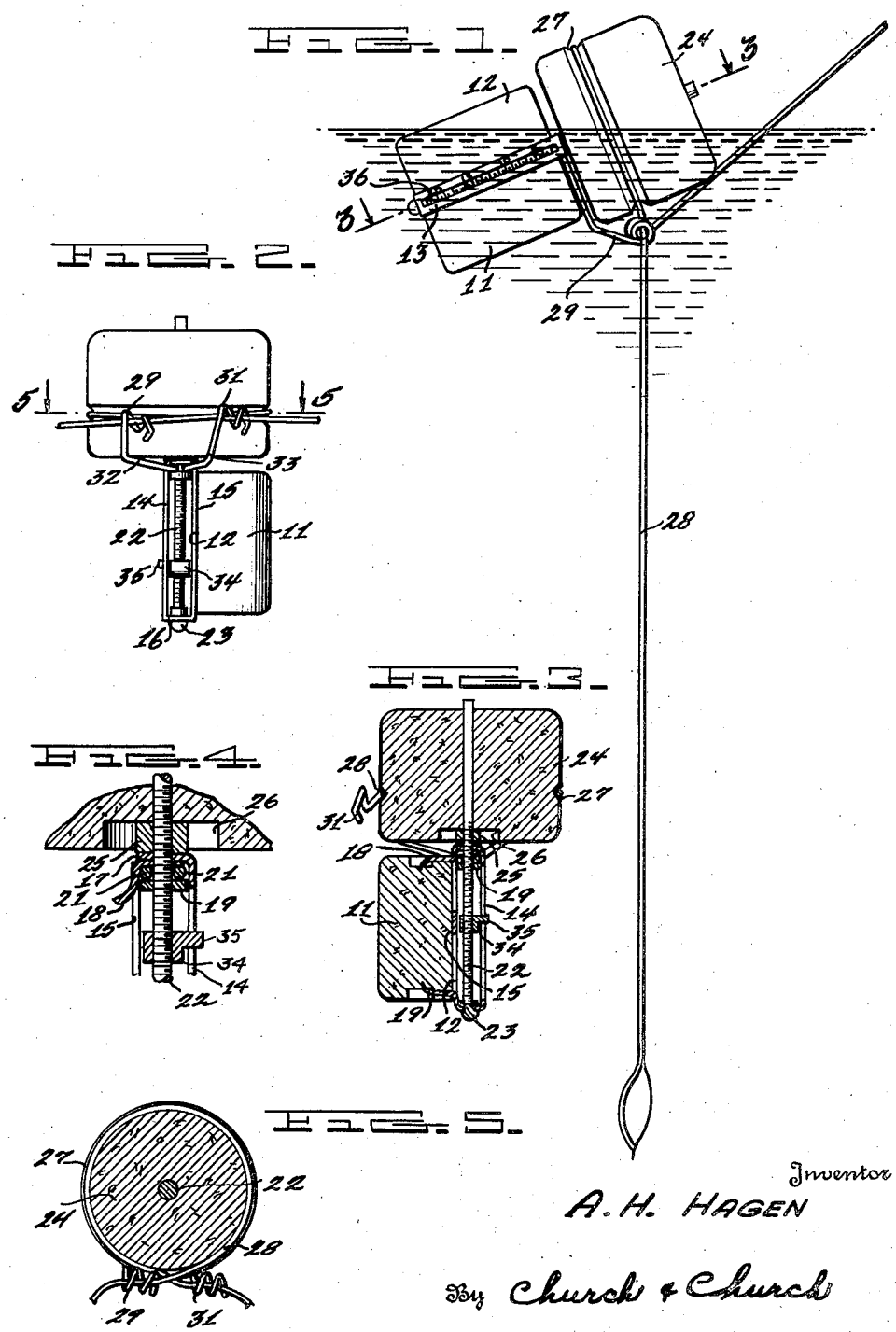

2,497,356

UNITED STATES PATENT OFFICE 2,497,356

FISHING FLOAT

Arthur H. Hagen, Los Angeles, Calif.

Application September 8, 1948, Serial No. 48,260

7 Claims. (Cl. 43—43.11)

This invention concerns fishing floats and particularly relates to a float which will measure out a predetermined length of fishing line to hold the sinker on the line at various selected depths below the float. More particularly, this invention relates to improvements in the type of fishing float shown in my copending application, Serial No. 760,972, filed July 15, 1947.

A major object of the invention is to provide an improved measuring type fishing float which may be attached to the fishing line while a sinker or hook is secured to the end of the line.

Another object of the invention is to provide a fishing float which is readily adjustable to hold a sinker at any pre-selected distance from the float and which is compact and of sturdy construction to insure the long life of the float.

A further object of the invention is to provide an improved float which will remain on the line and still permit a sinker or hook at the end of the line to be reeled in close to the end of the rod and which does not materially drag on the line or interfere with movement of the line.

Other objects and advantages of the invention will become apparent from the following specification taken in connection with the accompanying drawing wherein:

Figure 1 is an elevation of a preferred embodiment of the invention showing a fishing float attached to a fishing line with a sinker lowered into the water;

Fig. 2 is a front elevation of the float shown in Fig. 1;

Fig. 3 is a longitudinal section taken on the line 3—3 of Fig. 1;

Fig. 4 is a partial sectional view similar to Figure 3 but on an enlarged scale to more clearly show the rotatable parts of the invention; and Fig. 5 is a cross-section taken on the line 5—5 of Figure 2.

The preferred embodiment of the invention, as illustrated in the fishing float shown in the accompanying drawing, a main float section has a track at one end of which is supported a bearing to rotatably carry a threaded shaft extending along the track. At the other end of the track, a cap on the shaft is rotatably mounted in the track. The other end of the shaft, extending through the bearing beyond the track, carries a cylindrical float section rotatable with the shaft. A peripheral groove around the cylindrical float section receives the fishing line, and line guides are carried by the main float section and positioned adjacent the screw. A stop member is threaded on the shaft and slides along the track but is prevented from rotation relative to the track. Therefore, relative rotation of the float sections causes longitudinal movement of the stop member along the track. As the line is reeled in or out, the rotatable section turns and causes axial movement of the stop member. After a selected length of line has passed through the guides, the stop member engages a stop engaging member which prevents further sliding movement of the stop along the track and thereby prevents further relative rotation of the float sections. Thus, the sinker is automatically lowered to a predetermined length below the float.

For a more detailed description of the invention, reference may be had to the accompanying drawing. The fishing float illustrated in the drawing has a main float section 11 of semi-cylindrical shape. Extending along the flat surface 12 of the main float section is a track, designated generally at 13, having parallel spaced sides 14 and 15 integrally joined together by an end member 16 at one end and having their other ends overlapping, as shown at 17. The track is carried on the main float section 11 by prongs 18 and 19, which are pressed from the side 15 and embedded in the main section 11. The track 13 is so arranged on the main section 11 that it extends longitudinally thereof.

A ball bearing race 19 is mounted at one end of the track and includes ball bearings 21, which support a threaded shaft 22 and allow it to freely rotate relative to the track and to the main section 11. At the end of the threaded shaft, opposite to the bearing 19, the threaded shaft is provided with a cap 23 having a peripheral groove which is received by the end member 16 of the track to permit rotation of the cap but prevents longitudinal movement of the cap and the shaft. The other end of the shaft 22 extends through the bearing 19 and has fixed thereon a cylindrical float section 24 which rotates with the shaft. To space the cylindrical float section 24 from the main float section 11 and the track 13, a spacing sleeve 25 is positioned in a recess 26 in the face of the cylindrical float section 24 and bearing against one of the ends of the track which joins the parallel sides of the track at the bearing 19.

The cylindrical float section 24 is provided with a peripheral groove 27 adapted to receive a loop of the fishing line 28, as most clearly indicated in Figs. 1, 2 and 5. To guide the loop of the line which rides in the groove 27, a pair of spiral fishing line guides 29 and 31 are carried by brackets 32 and 33 extending upwardly from the main float section 11 where they are supported at the upper end of the track 13. The spirals forming the guides are positioned adjacent the peripheral groove 27 so the line extending from the rod passes through the guide 31, around the groove in the cylindrical float section 24, and out through the guide 29 where it is attached to the sinker. As shown in the drawing, the two guides 29 and 31 are spaced slightly apart so the line overlaps as it passes around the groove 27 of the cylindrical float section 24.

A stop member 34 is threaded on the shaft 22, like a nut, and has a projecting lug 35 slidable along a guideway in the form of a slot 36 formed in the side 14 of the track 13. With this arrangement, relative rotation of the float sections, causes turning movement of the threaded shaft 22 which thereby causes longitudinal sliding movement of the stop member 34 along the track 13. When the stop member reaches one end of the track, its further longitudinal sliding movement is prevented, thereby arresting further relative rotation of the float sections in the same direction. Of course, the direction of rotation of the float sections may be reversed and the stop member moved in the opposite direction toward the other end of the track.

To place this measuring fishing float on the fishing line, the end of the line nearest the rod is first inserted in the spiral guide 31, then passed once around the groove 27 in the cylindrical float section 24, and then inserted in the spiral guide 29, letting the free end of the line pass to the sinker. Before attaching the line, the float sections should be turned relative to one another to position projecting lug 35 on the stop member 34 opposite the appropriate indication of the depth to which it is desired for the sinker to descend below the surface of the water. As seen in Fig. 1, various depths are marked on the track 13. Then, after the line is applied to the float, with the sinker near the guide 29, the line may be played out and the sinker will descend, at the same time turning the cylindrical float section 24 relative to the main float section 11, thereby turning the threaded shaft 22 and causing the stop member 34 to slide along the track toward the cylindrical float section. When the stop member 34 engages the bearing 19, further movement of the stop member 34 will be arrested and further rotation of the cylindrical float member will be prevented. The indicia on the track is so calibrated that rotation of the cylindrical float member 24 will be stopped when the line has been played out an amount corresponding to the original setting of the lug 35 on the stop member 34.

Another important feature of the invention is the fact that this measuring float member permits the line to be reeled in until the sinker is almost at the end of the rod, the float actually moving along the line toward the sinker during the reeling in operation.

By the present invention, I have provided a fishing float of the measuring type which is of compact construction as all of the parts are contained within the dimensions of the two float sections. By providing a bearing for the threaded shaft and supporting the cylindrical float section on that shaft, a very durable construction is made possible and the free rotation of the parts avoids the possibility of the float dragging on the line.

What is claimed is:

1. A fishing float comprising a main float section, a cylindrical float section, means rotatably mounting said cylindrical float section on said main float section, a track carried by said main float section, a screw carried by said cylindrical float section and extending axially from said cylindrical float section along said track, a stop member threaded on said screw and slidable along said track but held against rotation relative thereto, and stop engaging means on said track to arrest movement of said member and thereby prevent relative rotation of said float sections.

2. A fishing float comprising a main float section, a cylindrical float section, means rotatably mounting said cylindrical float section on said main float section, said cylindrical float section being provided with a peripheral groove receiving a fishing line, line guiding means carried by said main float section and positioned adjacent the groove on said cylindrical float section, a track on said main float section, a screw carried by said cylindrical float section and extending axially from said cylindrical float section along said track, a stop member threaded on said screw so relative rotation of said float sections causes sliding movement of said stop along said track, said stop being engaged by said track for preventing rotation relative thereto, and stop engaging means on said track to arrest movement of said member and thereby prevent relative rotation of said float sections.

3. A fishing float comprising a main float section, a cylindrical float section, means rotatably mounting said cylindrical float section on said main float section, a track carried by said main float section, a screw carried by said cylindrical float section and extending axially from said cylindrical float section along said track, a stop member threaded on said screw and slidable along said track but held against rotation relative thereto, and stop engaging means on said track for engaging said stop to arrest sliding movement thereof along said track and thereby prevent relative rotation of said float sections.

4. A fishing float comprising a main float section, a track carried by said main float section, a bearing carried by said main float section at one end of said track, a threaded shaft extending along said track and rotatable in said bearing, a cylindrical float section mounted on said shaft, and a stop member threaded on said shaft and slidable along said track to engage said bearing, said stop member having a projection engaged with said track to prevent rotation relative thereto.

5. A fishing float comprising a main float section, a track carried by said main float section, a bearing carried by said main float section at one end of said track, a threaded shaft extending along said track and rotatable in said bearing, a cylindrical float section mounted on said shaft for rotation therewith, said cylindrical float section being provided with a peripheral groove for receiving a fishing line, guide means carried by said main float section and positioned adjacent said groove for guiding the fishing line thereon, and a stop member threaded on said shaft for movement along said track to engage said bearing upon relative rotation of said float sections, said stop member being provided with a projection for engaging said track to prevent rotation relative thereto.

6. A fishing float comprising a main float section, a track carried by said main float section, a bearing at one end of said track, a threaded shaft rotatable in said bearing and extending along said track, a cap on the end of said shaft rotatable in the other end of said track to prevent movement of said shaft longitudinally of said track, a cylindrical float section rotatably mounted on said shaft beyond said track, and a stop member slidable along said track and threaded on said shaft whereby relative rotation of said float sections causes longitudinal movement of said stop member to engage said bearing.

7. A fishing float comprising a main float section, a track carried by said main float section, a bearing carried by said main float section at one end of said track, a shaft extending along said track and rotatable in said bearing, one end of said shaft being provided with a cap rotatable in the other end of said track to prevent longitudinal movement of said shaft relative to said track, the other end of said shaft carrying a cylindrical float section rotatable therewith, said cylindrical float section being provided with a peripheral groove for receiving a fishing line, guide means carried by said main float section and positioned adjacent said groove, and a stop member slidable along said track and threaded on said shaft whereby relative rotation of said float section causes movement of said stop member along said track to engage said bearing.

ARTHUR H. HAGEN.

No references cited.